United States Patent [19]

Sainct et al.

[11] Patent Number: 5,062,051
[45] Date of Patent: Oct. 29, 1991

[54] METHOD FOR OBSERVING BY SCANNING A CELESTIAL BODY AND FOR MEASURING AN ANGULAR VELOCITY OF A SPACE VEHICLE, OBSERVATION SYSTEM FOR ITS IMPLEMENTATION, AND SPACE VEHICLE COMPRISING SAME

[75] Inventors: Hervé Sainct, Le Cannet; Patrick Maute, Valbonne; Jean-Francois Plantier, Nice, all of France

[73] Assignee: Aerospatiale Societe Nationale Industrielle, Paris, France

[21] Appl. No.: 345,592

[22] Filed: May 1, 1989

[30] Foreign Application Priority Data

Apr. 28, 1988 [FR] France ................................ 88 05708

[51] Int. Cl.$^5$ ............................................. G06F 15/50
[52] U.S. Cl. .................................... 364/459; 364/434; 244/171
[58] Field of Search ........................ 364/550, 459, 434; 250/347, 206.2, 206.3, 203.6; 356/28; 244/177, 171; 342/355-358; 382/1, 65, 45

[56] References Cited

U.S. PATENT DOCUMENTS

| 2,998,529 | 8/1961 | Nichinson et al. ............... 250/206.3 |
| 3,012,728 | 12/1961 | Marner ............................... 364/459 |
| 3,216,674 | 11/1965 | McLean ........................... 342/355 X |
| 3,310,982 | 3/1967 | Yamron ........................... 364/459 X |
| 3,535,521 | 10/1970 | Levine ................................. 250/349 |
| 3,576,999 | 5/1971 | Blythe et al. ........................ 364/456 |
| 3,769,710 | 11/1973 | Reister .......................... 250/203.6 X |
| 4,328,421 | 5/1982 | Falbel .................................. 250/347 |
| 4,617,634 | 10/1986 | Izumida et al. .................. 364/459 X |
| 4,658,361 | 4/1987 | Kosaka et al. .................. 364/459 X |
| 4,680,718 | 7/1987 | Sasaki et al. ..................... 244/171 X |
| 4,684,804 | 8/1987 | Sodeikat ........................ 250/347 X |
| 4,688,092 | 8/1987 | Kamel et al. ..................... 382/45 X |
| 4,749,159 | 6/1988 | Neufeld ............................... 244/177 |
| 4,801,202 | 1/1989 | Wilcox ........................ 250/206.2 X |
| 4,827,422 | 5/1989 | Savoca ............................... 364/459 |
| 4,837,699 | 6/1989 | Smay et al. ..................... 364/459 X |
| 4,909,460 | 3/1990 | Moura et al. .................. 244/177 X |
| 4,912,475 | 3/1990 | Counselman, III ............. 364/459 X |
| 4,944,587 | 7/1990 | Harigae ........................... 250/206.2 |

FOREIGN PATENT DOCUMENTS

| 0633497 | 12/1961 | Canada ............................... 364/459 |
| 0338687 | 10/1989 | European Pat. Off. ............ 244/177 |
| 2246843 | 5/1975 | France . |
| 2551201 | 3/1985 | France . |

OTHER PUBLICATIONS

Campbell et al., "Digital Attitude Reference System" Journal of The Institute of Navigation, vol. 20, No. 1, spring 1973 pp. 49–67.

Primary Examiner—Joseph L. Dixon
Attorney, Agent, or Firm—Browdy and Neimark

[57] ABSTRACT

A method and apparatus to perform the observation and imaging from a space vehicle by scanning of a celestial body with reference to a scanning axis, forming successively two signals corresponding to the scanning in a given directional series of a line or band including ground area, detecting in each of these signals a characteristic transition representative of a given characteristic point of this line or band of ground, reading the relative position of these transitions in these signals, and determining an angular velocity of the space vehicle from any divergence between these relative positions while taking into account the time interval separating the instants where each of these transitions appeared in the aforementioned formed signals.

13 Claims, 3 Drawing Sheets

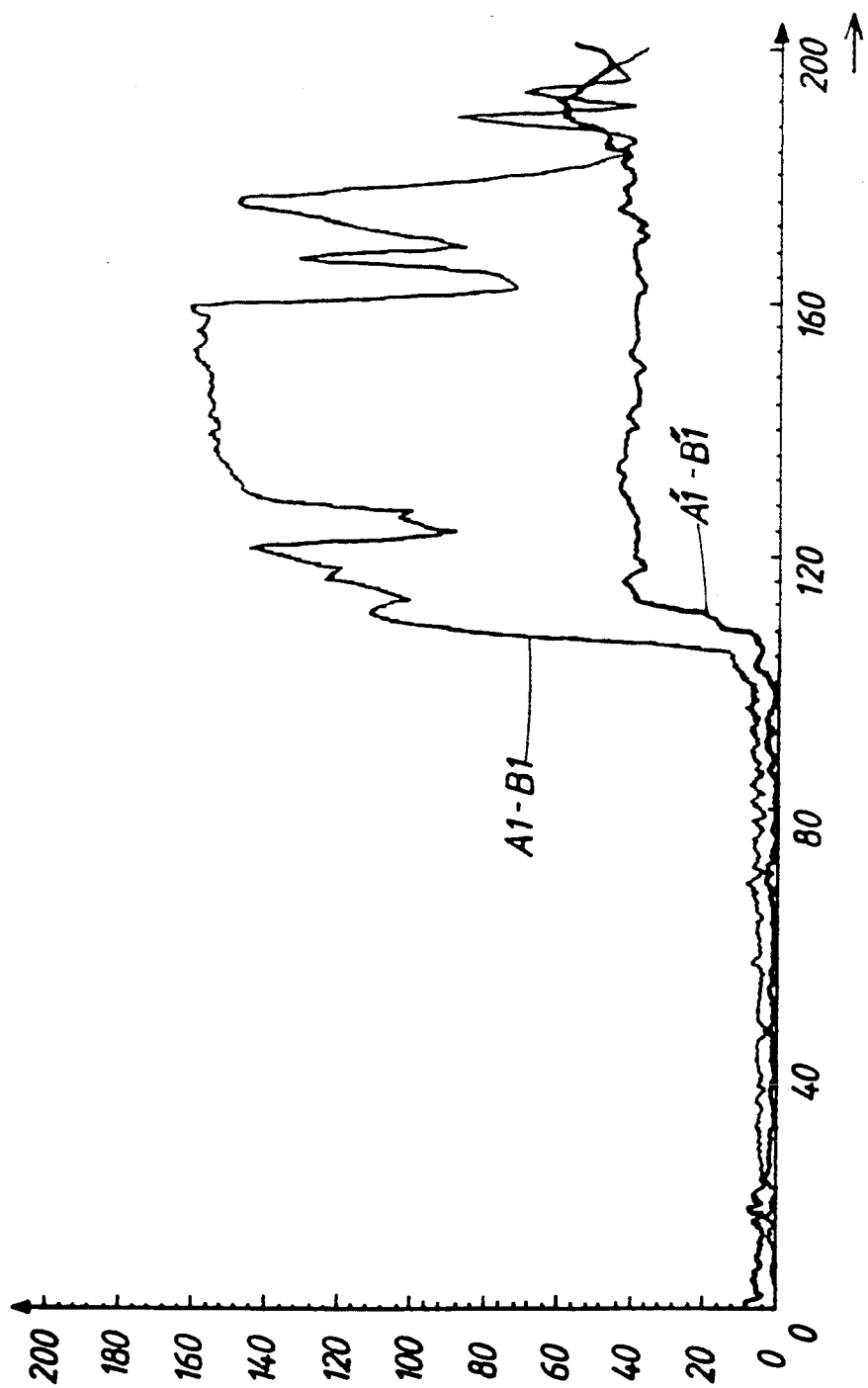

5,062,051

METHOD FOR OBSERVING BY SCANNING A CELESTIAL BODY AND FOR MEASURING AN ANGULAR VELOCITY OF A SPACE VEHICLE, OBSERVATION SYSTEM FOR ITS IMPLEMENTATION, AND SPACE VEHICLE COMPRISING SAME

FIELD OF THE INVENTION

The invention concerns the precise measure of the instantaneous angular velocity about a given axis (for example the drift of pitching) of a satellite or other space vehicle provided with a pay load for imagery of the earth or another planet opposite which planet is placed this satellite with a view to observation of that planet.

The measurement of this instantaneous angular velocity may notably be utilized for the attitude control of this space vehicle.

BACKGROUND OF THE INVENTION

There exist at least several ways of obtaining information on the attitude of a satellite: by implementation of specific sensors for the observation of the Sun, of the stars, or of the Earth, or by inertial reference of a gyrometric type. Some examples of this are given in the documents BE-854.174, FR-2.319.150, U.S. Pat. No. 3,535,521, U.S. Pat. No. 3,641,347, U.S. Pat. No. 3,992,106, U.S. Pat. No. 4,628,206 or WO 87/00653.

In the case of a terrestial detection, there already exist a large number of simple specific sensors, but their precision augments with their size, their bulk and their weight. Currently, a detector endowed with sufficient precision to effectively point an optical instrument of an imagery load itself comprises an optical device of a size comparable to this instrument.

The invention aims to do away with the redundance of these optics and to avoid the necessity of providing a specific sensor, which only measures precisely one of the components of attitude variation of a satellite.

To this effect, only one instrument is used for two functions: the instrument serving to obtain the image of the Earth (or another planet or celestial object) by scanning, is modified and completed in a fashion to equally measure the angular velocity of the satellite about an axis parallel to the axis of the line of scanning, with a precision equal to, indeed better than, the angle with which one sees from the satellite the thickness (or step) of the line scanning the ground.

In one embodiment of the invention the modification consists in the addition to the detectors normally provided in the focal plane of the optical scanning instrument of two detectors:
 one on the optical axis,
 the other, remote from this axis perpendicularly to the scanning lines within limits permitted by the opening of the optical system, by a value d, in a direction opposite to that in which one passes successively from one line to the next.

The first supplementary detector may be done away with if its function may be performed by one of the normal detectors of the focal plane.

The value d is chosen in such a way that, at each instant, the point aimed at on the ground by the second detector is remote from that which is aimed at on the ground by the first one by the exact distance e which is on the ground between two lines, in the direction perpendicular to that of the scanning.

In practice, the known devices for observation by scanning provide North-South scanning by lines orientated East-West, The invention permits in this case the observation of the drift of pitching of such an observation satellite.

In this way, the signal supplied by the second detector in the course of scanning a line is identical to the signal supplied by the first detector in the course of scanning the following line, on condition that the detectors are correctly calibrated and that the sighted object does not move, or moves very little, between one line and the next. In this way, the rotundity of the Earth and the state or thickness of the atmosphere have no influence on the repetition of this signal.

If one measures the instant of passage of the signal from the detectors by a fixed threshold corresponding, for example, to the transition between space and the Earth (in passing through the atmosphere), or more generally between two luminous zones very different in their image, one obtains in the course of each line, for the second detector, a signal which repeats itself identically on the first detector when scanning the following line. This repetition permits permanent tracking of the drift of attitude around the scanning axis, which in turn allows a resetting of, for example, a gyrometer in the satellite.

The invention is applicable in the case where the scanning of a line is instantaneous or sufficiently rapid so that movement of the atmosphere (moving element in the sighted object) is negligible during this time of scanning.

Combinations of two groups of detectors, instead of two detectors, from which one makes an average of the out-going signals, or with the object of redundance, may be used for reducing the calibration errors and/or to obtain more precise information about the angular drift (of the attitude).

In the same way, the fact that the first detector or sensor must be aligned on the optical axis is not at all necessary, the constraint being that the divergence between the two sensors remains equal to the previously defined distance "d" (or a complete multiple of it). In a perfected version of the invention, the sensors are divided into two groups, each group being in the aggregate displaced with respect to the optical axis so as to eliminate the problem posed by the detection of the horizon at the poles (lack of contrast).

In very general terms, the invention proposes an observation method by scanning of a celestial body from a space vehicle comprising a scanning observation system with reference to a scanning axis charaterized by forming successively two signals corresponding to the scanning, in a given scanning direction, of a same band of ground, detecting in each of these signals a characteristic transition representative of a same characteristic point of this band of ground, picking up the relative position of these transitions in these signals, and determining, from any divergence between these relative positions, a possible angular velocity of the space vehicle, taking into account the difference of time separating the instants where each of these transitions appeared in the aforementioned signals.

Thus, this process permits with the same system of observation, the observation by scanning of a celestial body such as the Earth from a space vehicle, and the measurement of the angular velocity of this vehicle around the scanning axis in relation to this celestial body. This results in an appreciable gain in reliability, in simplicity, in bulk, in weight and therefore in available mass.

The invention equally proposes a system of observation of celestial bodies in space, adapted to the implementation of this process, of a type comprising an optical scanning device adapted, with reference to a scanning axis, to scrutinize line by line the celestial body, a detection group in the focal plane of this optical device and along the optical axis of the latter, and an image formation and treatment system connected to this detection group, characterized in that it comprises first and second elements of detection with identical spectral characteristics disposed in the focal plane and displaced parallel to the scanning axis by a distance seen by the optical device from an angle equal to an entire multiple, at least equal to one, of the angle from which this optical device sees the distance between two successive or adjacent scanning lines intercepting the celestial body, as well as a device for angular velocity treatment and measurement connected to each of said detection elements and comprising:

a circuit to read successively, first by one then by the other of these detection elements, the signals representative of a same band of ground scanned on the celestial body, these signals being treated, if necessary, to correspond to one and a same given directional series along this band on the ground:

a circuit to detect in each of these signals a characteristic transition representative of a same characteristic point of the band of ground;

a circuit to read the relative position of each transition in relation to the signal that includes it, and;

a computation circuit adapted to determine, from any difference between these relative positions, an eventual angular velocity of the space vehicle around an axis parallel to the scanning axis, taking into account the time interval separating the instants from which have been read the aforementioned characteristic transitions.

Finally, the invention proposes a space vehicle comprising this system of observation, and angular velocity detectors for only the angular drift of the space vehicle around axes perpendicular to the scanning axis of the observation system.

One will appreciate that it is already known to associate attitude measurements and operations for taking images, for example in the following documents U.S. Pat. No. 4,682,300, U.S. Pat. No. 4,688,091, U.S. Pat. No. 4,688,092 and FR-2.556.159, but this association aims to compensate for the perturbations affecting images due to an eventual drift of attitude.

Further, it is already known through document FR-2.551.201 how to monitor an eventual drift of attitude thanks to a system of observation, but here it is a question of a quite different solution bringing into play a completely different process of forming images, without any scanning in the sense of the invention, with implementation of parallel lines of couple charge detectors (type CCD).

BRIEF DESCRIPTION OF THE DRAWINGS

The objects, characteristics and advantages of the invention are brought out in the description that follows, given as a non restrictive example, with regard to the attached diagrams in which:

FIG. 4 is a graph showing the corresponding signals obtained by an infra-red detector and a detection of visible light;

DETAILED DESCRIPTION OF THE PREFERRED EMBODIMENTS

Figure 1:
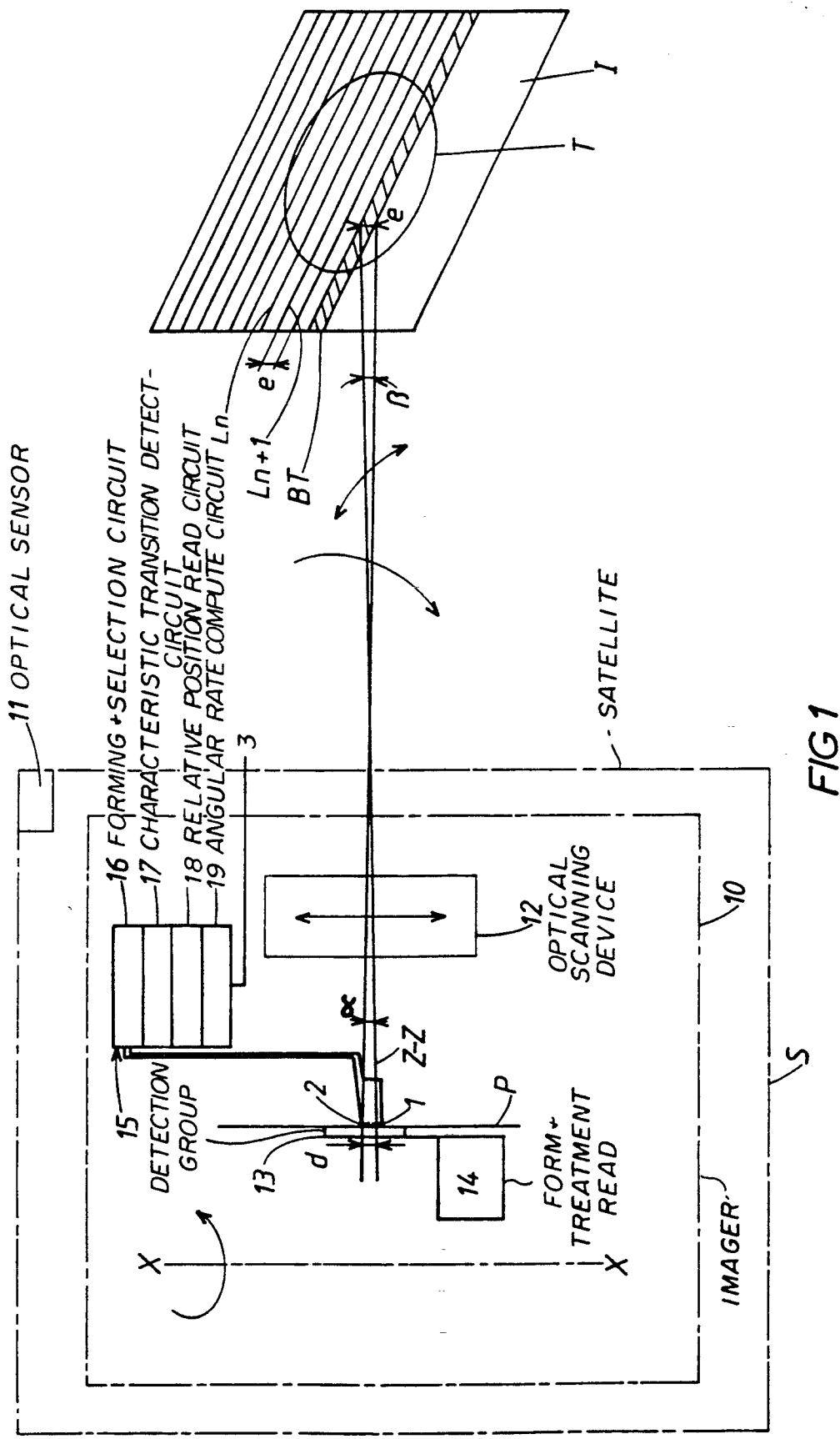
FIG. 1 is a diagram of the principle of a device corresponding to the invention and its implementation.

The example described below concerns in particular meteorological observation satellites.

Such a satellite schematized as S contains an observation system 10 or imager which scans the image I of the Earth T and part of the surrounding space.

The scanning lines $L_n$ are orientated East-West, the line jumps ($L_n$ to $L_{n+1}$) are made in the North-South direction. The scanning axis X—X is therefore orientated North-South. The movement of attitude during the taking of an image must be measured very precisely.

The perpendicular components of the scanning axis are measured in conventional fashion by a classic optical sensor (solar or stellar) schematized as 11.

The observation system or imager 10 consists of an optical scanning device 12 known in itself, adapted, with reference to the scanning axis X—X, to scrutinize line by line the Earth T. In the focal plane P of this optical device 12 and along the optical axis Z—Z of the latter is placed a detection group 13 of any appropriate known type, with which is associated a system 14 of formation and treatment of images known in itself, adapted to read for each point on the ground the value of the signal and its date.

In the focal plane P are equally placed first and second electromagnetic detection elements 1 and 2 indentical to each other, of any appropriate known type (adapted to react to incident radiation of same spectral characteristics, notably visible light and/or infra-red).

In the example in FIG. 1, these elements of detection 1 and 2 are distinct from the detection group 13, one of these elements (1) being situated on the optical axis Z—Z. These elements are, for example, constituted each one by a detector.

The elements of detection are separated parallel to the scanning axis Z—Z by a distance d which is seen by the optical device 12 from an angle $\alpha$ equal to a complete multiple, at least equal to one, of the angle $\beta$ with which this optical device sees the distance e between two contiguous lines $L_n$ and $L_{n+1}$ intercepting the celestial body T. The angles $\alpha$ and $\beta$ are, for example, equal to each other (in FIG. 1 the angle $\beta$ has been artificially enlarged for reasons of legibilty of the drawing).

To the detection elements 1 and 2 are connected a device for treating and measuring the angular velocity 15 comprising:

a circuit 16 adapted to form and select signals A and B (see FIG. 5) read successively (as well as the dates of the points which constitute them) by these detection elements, for a given band of ground BT scanned on the Earth T, these signals being treated, if necessary, to correspond to the same directional series along this band (East-West, or West-East);

a circuit 17 adapted to detect in each of these signals A and B a characteristic transition A1 and B1 representative of a given characteristic point of the band of ground under consideration (for example, the interface space/atmosphere and/or Earth, or any other geographic detail causing a marked contrast such as a transition between a stretch of water and solid ground, or river, or gorge . . . );

a circuit 18 adapted to read the relative position of each transition A1 or B1 in relation to signal A or B (by reference, for example, to the left extremity of each signal); and a computation circuit 19 adapted to determine, from some divergence $\Delta_1$ between these relative positions, the angular velocity $\omega$ if any of the satellite, taking account of the interval of time existing between the instants where each of the discontinuities A1 and B1 has been read.

The constitution of these circuits poses no difficulties for the men skilled in the art given the preceding instructions and will not be detailed further here.

In effect, in the case under consideration where $\alpha$ and $\beta$ are equal and where a given band of ground is observed by the detection elements 1 and 2 in the course of successive scanning of two adjoining lines, if one measures the instant of passage of the signal from the detectors 1 and 2 by a fixed threshold V corresponding, for example, to the transition between space and the Earth (in passing through the atmosphere), or more generally between two very different luminous zones in the image, one obtains in the course of each line, for the second detector 2, a signal (A) which repeats itself "a priori" to the identical as (B) on the first detector when same scans the following line $L_{n+1}$. This repetition permits one to follow constantly the drift of the attitude around the scanning axis, which permits one to readjust the gyrometer, that is to say to annul the measured drift, for example in the case of a gyrometer in the satellite.

The invention is applicable in the case where the scanning of a line is instantaneous or sufficiently rapid so that the movement of the atmosphere (moving element in the sighted object) is negligible during this scanning time.

Figure 2:
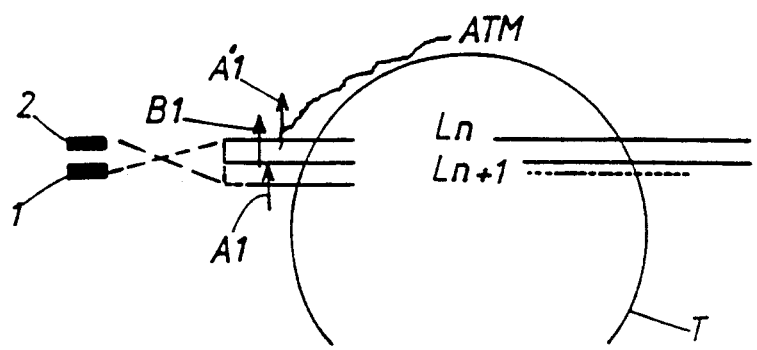
FIG. 2 is a diagram of the principle of the detection of the edges of the Earth.

In FIG. 2 where the atmosphere is partially represented by an irregular line ATM, the vertical arrows symbolise the detection of the edge of the earth A1 or B1, as well as A'1 read by detector 2 whilst detector 1 scrutinises an adjoining line.

Figure 3:
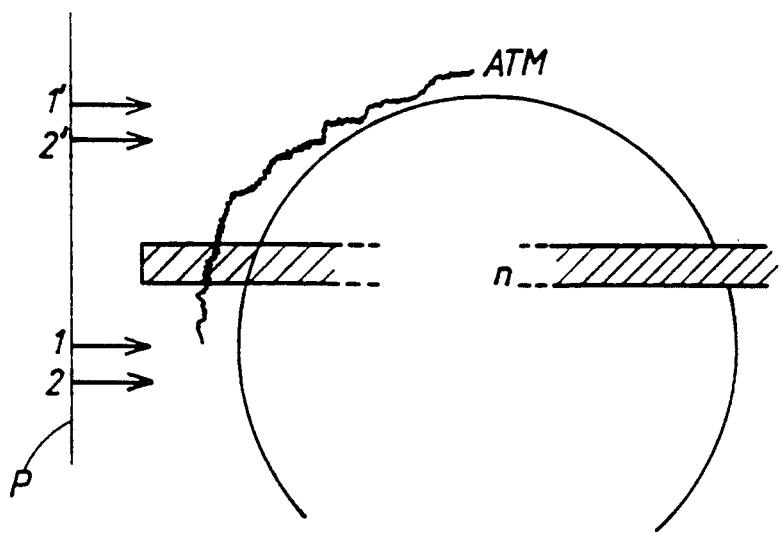
FIG. 3 is a diagram illustrating the implementation of two pairs of detectors.

To avoid the disappearance of clear thresholds, that is to say a steep gradient, in the neighborhood of the poles, detectors 1 and 2 are sub-divided into two pairs (1, 2, and 1', 2' on FIG. 3) each pair being in its whole offset within the focal plane in relation to the optical axis towards the North or towards the South, which has the effect of offsetting too the line of sight. In this way, when the North of the image starts to be scanned, the pair with the lines of sight offset or adjusted towards the South will detect the intersections space/earth sufficiently to the South of the North pole so that the transitions are clear.

In the same way, when the South of the image is scanned one uses the pair with lines of sight adjusted towards the North.

In the vicinity of the middle of the image, one swings from one pair to the other successively, using the following pairs of detectors:

1 and 2 (nominal configuration)

then 1 and 2' (transition stage: one compares the threshold of detector 1 and that of detector 2' of the preceding line)

then 1' and 2' (other nominal configuration, one compares the threshold of detector 1' with that of detector 2' on the preceding line).

The wavelength used for detectors 1, 2, 1', 2', is preferably close to the infra-red so as to obtain a strong contrast earth/space, even when the Earth is not lit by the Sun. In practice the wavelength used may be, very generally, chosen from a wide spectral band.

Lastly, each pair of detectors is in fact constituted of two groups of detectors to assure the redundance of their function.

The intensity-distance curve in FIG. 4 shows the results of a simulation using image data from METEOSTAT.

One distinguishes clearly on it the transition Earth/space A1 or B1 for the infra-red detectors, and A''1 or B''1 for the visible wavelength detectors, less effective at night.

One notes that the utilization of the optical instrument 10 itself permits dispensing with a second optics as in known solutions, and with any other sensor (Sun, stars) fulfilling the same function of measurement of angular velocity around the axis X—X. The combination of two detectors permits independence from the rotundity of the earth and from fluctuations of the atmosphere. It goes without saying that the preceeding description has only been proposed by way of a non-restrictive example and that numerous variants can be proposed by an expert without deviating from the framework of the invention.

Figure 5:
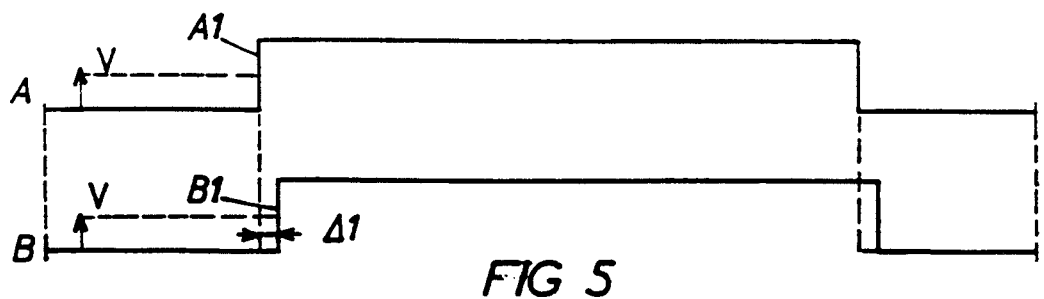
FIG. 5 is a diagram illustrating the signals observed by the detection elements for a given band of ground.

So for example, one will appreciate that the reasoning shown as to FIG. 5 is independent of the direction in which the considered band of ground is scanned for the constitution of signal A then signal B, which is compatible with scanning in alternate directions.

In variation, the angle $\alpha$ is an even multiple of $\beta$, equal for example to 2 in which case, whatever the direction of scanning successive lines, one can forecast that the time separating transitions A1 and B1 should be in theory, in the absence of angular velocity, a multiple of the duration of scanning of each line.

Further, the positions of the detection elements 1 and 2 can be inverted in which case the chronological order of signals A and B is inverted, which does not change in substance the principle of the invention.

The signal of speed produced by the treatment device 15 can be used to very diverse ends, notably for the control of attitude of the satellite with the assistance of known classic means utilized to this effect i.e. nozzles.

We claim:

1. A method of observation and imaging by scanning lines or bands of a celestial body from a space vehicle comprising the steps of scanning along an optical axis successive adjacent lines or bands of a field of view to be imaged, including ground area on lines or bands across the celestial body, with said lines or bands being transverse with reference to a scanning axis;

forming successively two signals of each line or band in the field of view;

detecting in each of these signals a characteristic transition representative of a same given characteristic point on said ground area on said line or band in a given scanning direction;

reading the relative positions of said transitions in said signals and determining the value of a rate of angular change of the space vehicle from any difference between said relative positions including taking into account a time interval separating the instants where each of said transitions appear in said signals.

2. The method of observation and imaging according to claim 1 further comprising the step of
controlling the attitude of the space vehicle about said scanning axis by annulling said measured difference and rate of angular change.

3. The method of observation and imaging according to claim 1 wherein
successive scanning of each line or band is in a same direction.

4. The method of observation and imaging according to claim 1
successive scanning of each line or band is in opposite directions with signals of intensity versus time not being identical but signals being equal in intensity versus position in the image being drafted.

5. The method of observation and imaging according to claim 1 further comprising the step of
forming successively two signals of each line or band in the field of view by scanning said same two distinct lines or bands from a second position in a focal plane parallel to said scanning axis and offset relative to said optical axis.

6. An imaging device for a space vehicle facing a celestial body comprising
an optical scanning device with a field of view having an optical axis to be pointed towards the celestial body to be imaged to scan successively adjacent lines or bands of said field of view;
a scanning axis and a focal plane both transverse to said optical axis;
a detection assembly in said focal plane;
said detection assembly including
first and second detecting means arranged in said focal plane and offset parallel to said scanning axis by a distance viewed by said optical scanning device with an angle equal to an integer multiple, at least equal to one, of an angle at which said optical scanning device views the distance between two adjoining scanning lines crossing the celestial body;
and an image formation and treatment unit connected to said first and second detecting means;
said image formation and treatment unit including
a forming and selection circuit for successively collecting by one and then the other of said first and second detecting means signals representing a given line or band of scanned ground on the celestial body and treating said signals to correspond to one and a same given directional series along said line or band of scanned ground,
a characteristic transition detection circuit to detect in each of said signals a characteristic transition representative for a given point characteristic of said line or band of scanned ground,
a relative position reading circuit to read the relative position of each transition in relation to said signal which includes it,
and a computation circuit to determine from any difference between said relative positions a value for a rate of angular change of the space vehicle about an axis parallel to said scanning axis and taking into account the interval separating the instants at which said characteristic transitions are read.

7. The imaging device according to claim 6 wherein said first detecting means is located on said optical axis of said optical scanning device.

8. The imaging device according to claim 6 wherein each of said first and second detecting means is subdivided into two sub-elements displaced parallel to said scanning axis;
each said sub-element being offset in said focal plane in relation to said optical axis parallel to said scanning axis.

9. The imaging device according to claim 6 wherein the angle formed by the distance between said first and second detecting means and the angle formed by the distance between two adjacent scanning lines or bands are equal in view of the imaging device.

10. The imaging device according to claim 6 wherein the angle formed by the distance between said first and second detecting means is an even multiple of the angle formed by the distance between two adjacent scanning lines or bands;
and the difference between said characteristic transitions is defined by the difference between a time interval separating said characteristic transitions and a given multiple pair of durations of scanning of each line or band.

11. The imaging device according to claim 6 wherein said detecting means are sensitive to infra-red radiation.

12. The imaging device according to claim 6 further comprising
a space vehicle having the imaging device installed thereon;
said scanning axis in fixed relationship to said space vehicle;
said detecting means detecting rate of angular change associated with perpendicular axes of rotation of said scanning axis.

13. The imaging device according to claim 6 wherein said scanning axis is parallel to a North-South direction.

* * * * *